United States Patent
Yu et al.

(10) Patent No.: US 12,316,399 B2
(45) Date of Patent: May 27, 2025

(54) POWER LINE COMMUNICATION SYSTEM, POWER ELECTRONIC APPARATUS, AND INTERFERENCE SUPPRESSION METHOD

(71) Applicant: Huawei Digital Power Technologies Co., Ltd., Shenzhen (CN)

(72) Inventors: Xinyu Yu, Shanghai (CN); Fuqiang Xu, Shanghai (CN); Kai Xin, Shanghai (CN); Peng Dong, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 55 days.

(21) Appl. No.: 18/488,161

(22) Filed: Oct. 17, 2023

(65) Prior Publication Data

US 2024/0048179 A1  Feb. 8, 2024

Related U.S. Application Data

(63) Continuation of application No. PCT/CN2021/089416, filed on Apr. 23, 2021.

(51) Int. Cl.
*H04B 3/54* (2006.01)
*H04B 3/30* (2006.01)
*H04B 3/50* (2006.01)

(52) U.S. Cl.
CPC ............. *H04B 3/54* (2013.01); *H04B 3/30* (2013.01)

(58) Field of Classification Search
CPC ............. H04B 3/54; H04B 3/30; H04B 3/56
See application file for complete search history.

(56) References Cited

U.S. PATENT DOCUMENTS

| | | | | |
|---|---|---|---|---|
| 2006/0044076 A1* | 3/2006 | Law | ............... | H04B 3/56 333/124 |
| 2006/0227884 A1* | 10/2006 | Koga | ............... | H04B 3/54 375/257 |
| 2012/0076050 A1* | 3/2012 | Masuda | ............... | H04L 12/413 370/254 |

FOREIGN PATENT DOCUMENTS

| | | |
|---|---|---|
| CN | 106300356 A | 1/2017 |
| CN | 108923823 A | 11/2018 |
| CN | 106329563 B | 5/2019 |
| CN | 107528495 B | 11/2019 |

* cited by examiner

*Primary Examiner* — David S Huang
(74) *Attorney, Agent, or Firm* — Maier & Maier, PLLC

(57) ABSTRACT

A power line communication (PLC) system includes a PLC signal transmitting end, a PLC signal receiving end, and a power electronic apparatus. The PLC signal transmitting end is connected to the PLC signal receiving end through a power line, and the power electronic apparatus is connected to the power line. The power electronic apparatus is configured to increase output impedance in a first PLC communication frequency band, to reduce interference from an output current of the power electronic apparatus to a PLC signal in the first PLC communication frequency band. The first PLC communication frequency band is a PLC communication frequency band in which the PLC signal transmitting end sends the PLC signal to the PLC signal receiving end. In this way, the interference from the power electronic apparatus to the PLC signal in the first PLC communication frequency band can be reduced without adding an additional passive filter.

20 Claims, 8 Drawing Sheets

POWER LINE COMMUNICATION SYSTEM, POWER ELECTRONIC APPARATUS, AND INTERFERENCE SUPPRESSION METHOD

CROSS-REFERENCE OF RELATED APPLICATIONS

This application is a continuation of International application No. PCT/CN2021/089416, filed on Apr. 23, 2021, the disclosure of which is hereby incorporated by reference in its entirety.

TECHNICAL FIELD

The embodiments relate to the field of communication technologies, a power line communication system, a power electronic apparatus, and an interference suppression method.

BACKGROUND

Power line communication (PLC) is a communication technology that uses a medium/low-voltage power distribution network as a communication medium to transmit data and exchange information. The most significant feature of the PLC is that data can be transmitted based on an existing power transmission line (which is briefly referred to as a power line) without re-establishing a new network. This may greatly reduce layout costs of communication lines. However, as a power electronic apparatus is more widely used in a power line communication system, interference from the power electronic apparatus to PLC communication gradually becomes more noticeable. A switching frequency of the power electronic apparatus is relatively high and may be higher than a PLC communication frequency band. Therefore, harmonic interference in the PLC communication frequency band is caused. Consequently, PLC communication quality is affected. In view of this, a related technology proposes that a filter may be connected to an output end of the power electronic apparatus, to reduce interference from the power electronic apparatus to a PLC communication signal on a power transmission line. However, this manner of adding an additional passive apparatus increases costs of the power line communication system and is not applicable.

SUMMARY

The embodiments may provide a power line communication system, a power electronic apparatus, and an interference suppression method, which may reduce interference from the power electronic apparatus to a PLC signal in a first PLC communication frequency band without adding an additional passive filter. This reduces interference suppression costs and is highly applicable.

According to a first aspect, the embodiments may provide a power line communication system. The power line communication system includes a PLC signal transmitting end, a PLC signal receiving end, and a power electronic apparatus. The PLC signal transmitting end is connected to the PLC signal receiving end through a power line, and the power electronic apparatus is connected to the power line. The power electronic apparatus is configured to increase output impedance in a first PLC communication frequency band, to reduce interference from an output current of the power electronic apparatus to a PLC signal in the first PLC communication frequency band. The first PLC communication frequency band is a PLC communication frequency band in which the PLC signal transmitting end sends the PLC signal to the PLC signal receiving end. The power electronic apparatus may be an inverter, a frequency converter, or the like. This is not limited herein. For example, the power electronic apparatus may be a three-phase inverter, a single-phase inverter, or the like. This is not limited herein.

Interference from the power electronic apparatus to PLC communication is suppressed through self-control of the power electronic apparatus without adding an additional passive filter. This can reduce interference suppression costs and improves applicability of the solution. The output impedance of the power electronic apparatus in the PLC communication frequency band may be increase, to reduce the interference from the power electronic apparatus to the PLC communication.

With reference to the first aspect, in a first possible implementation, the PLC system further includes a controller, the controller is connected to the power electronic apparatus, and the controller is configured to send the first PLC communication frequency band to the power electronic apparatus.

A host computer (that is, the controller) of the power electronic apparatus may be reused to send the first PLC communication frequency band to the power electronic apparatus, to increase the output impedance of the power electronic apparatus in the first PLC communication frequency band. It may be understood that the controller may be reused to further reduce costs.

With reference to the first aspect or the first possible implementation of the first aspect, in a second possible implementation, the power electronic apparatus is configured to reduce a harmonic current or an interharmonic current in the first PLC communication frequency band, to increase the output impedance in the first PLC communication frequency band.

The harmonic current or the interharmonic current in the first PLC communication frequency band may be reduced to increase the output impedance in the first PLC communication frequency band. In this way, the solution can be implemented more easily.

With reference to the second possible implementation of the first aspect, in a third possible implementation, the power electronic apparatus includes a control unit and a power electronic circuit, where the power electronic circuit includes at least one switch device. The control unit is configured to: generate a switch signal based on a target control voltage and control an action of the switch device in the power electronic circuit based on the switch signal, so as to control the harmonic current or the interharmonic current of the power electronic circuit in the first PLC communication frequency band.

The switch signal may be generated based on the target control voltage, so as to control the action of the switch device in the power electronic circuit based on the switch signal and to reduce the harmonic current or the interharmonic current of the power electronic circuit in the first PLC communication frequency band. This is easy to operate.

With reference to the third possible implementation of the first aspect, in a fourth possible implementation, the power electronic apparatus further includes a sampling unit. The sampling unit is configured to detect the output current of the power electronic circuit. The control unit is configured to extract a current component, in the first PLC communication frequency band, of the output current that is of the power electronic circuit and that is detected by the sampling unit, so as to use the current component as the harmonic current or the interharmonic current of the power electronic circuit in the first PLC communication frequency band.

With reference to the third possible implementation of the first aspect or the fourth possible implementation of the first aspect, in a fifth possible implementation, the control unit is configured to determine the target control voltage based on an output voltage of the power electronic circuit and a preset control voltage. The preset control voltage is determined based on the harmonic current or the interharmonic current of the power electronic circuit in the first PLC communication frequency band and a preset current.

With reference to the fifth possible implementation of the first aspect, in a sixth possible implementation, the control unit is configured to determine the preset control voltage based on the harmonic current or the interharmonic current of the power electronic circuit in the first PLC communication frequency band and the preset current.

With reference to the sixth possible implementation of the first aspect, in a seventh possible implementation, the control unit is configured to perform a proportional integral operation or a proportional resonant operation on a current difference between the harmonic current or the interharmonic current in the first PLC communication frequency band and the preset current, to obtain the preset control voltage.

According to a second aspect, the embodiments may provide a power electronic apparatus. The power electronic apparatus is applicable to a power line communication system. The power line communication system further includes a PLC signal transmitting end and a PLC signal receiving end, the PLC signal transmitting end is connected to the PLC signal receiving end through a power line, and the power electronic apparatus is connected to the power line. The power electronic apparatus includes a control unit and a power electronic circuit. The control unit is configured to increase output impedance of the power electronic circuit in a first PLC communication frequency band, to reduce interference from an output current of the power electronic circuit to a PLC signal in the first PLC communication frequency band. The first PLC communication frequency band is a PLC communication frequency band in which the PLC signal transmitting end sends the PLC signal to the PLC signal receiving end.

With reference to the second aspect, in a first possible implementation, the power line communication system further includes a controller, the controller is connected to the control unit, and the control unit is configured to receive the first PLC communication frequency band from the controller.

With reference to the second aspect or the first possible implementation of the second aspect, in a second possible implementation, the control unit is configured to reduce a harmonic current or an interharmonic current in the first PLC communication frequency band, to increase the output impedance in the first PLC communication frequency band.

With reference to the second possible implementation of the second aspect, in a third possible implementation, the power electronic circuit includes at least one switch device.

The control unit is configured to: generate a switch signal based on a target control voltage and control an action of the switch device in the power electronic circuit based on the switch signal, so as to control the harmonic current or the interharmonic current of the power electronic circuit in the first PLC communication frequency band.

With reference to the third possible implementation of the second aspect, in a fourth possible implementation, the power electronic apparatus further includes a sampling unit.

The sampling unit is configured to detect the output current of the power electronic circuit. The control unit is configured to extract a current component, in the first PLC communication frequency band, of the output current that is of the power electronic circuit and that is detected by the sampling unit, so as to use the current component as the harmonic current or the interharmonic current of the power electronic circuit in the first PLC communication frequency band.

With reference to the third possible implementation of the second aspect or the fourth possible implementation of the second aspect, in a fifth possible implementation, the control unit is configured to determine the target control voltage based on an output voltage of the power electronic circuit and a preset control voltage.

The preset control voltage is determined based on the harmonic current or the interharmonic current of the power electronic circuit in the first PLC communication frequency band and a preset current.

With reference to the fifth possible implementation of the second aspect, in a sixth possible implementation, the control unit is configured to determine the preset control voltage based on the harmonic current or the interharmonic current of the power electronic circuit in the first PLC communication frequency band and the preset current.

With reference to the sixth possible implementation of the second aspect, in a seventh possible implementation, the control unit is configured to perform a proportional integral operation or a proportional resonant operation on a current difference between the harmonic current or the interharmonic current in the first PLC communication frequency band and the preset current, to obtain the preset control voltage.

According to a third aspect, the embodiments may provide an interference suppression method for a power line communication system. The method is applicable to a power electronic apparatus in the power line communication (PLC) system. The PLC system includes a PLC signal transmitting end, a PLC signal receiving end, and the power electronic apparatus, the PLC signal transmitting end is connected to the PLC signal receiving end through a power line, and the power electronic apparatus is connected to the power line. The method includes: The power electronic apparatus obtains a first PLC communication frequency band, where the first PLC communication frequency band is a PLC communication frequency band in which the PLC signal transmitting end sends a PLC signal to the PLC signal receiving end. The power electronic apparatus increases output impedance in the first PLC communication frequency band, to reduce interference from an output current of the power electronic apparatus to the PLC signal in the first PLC communication frequency band.

With reference to the third aspect, in a first possible implementation, the system further includes a controller, and the controller is connected to the power electronic apparatus; and the method further includes:

The power electronic apparatus receives the first PLC communication frequency band from the controller.

With reference to the third aspect or the first possible implementation of the third aspect, in a second possible implementation, the method further includes:

The power electronic apparatus reduces a harmonic current or an interharmonic current in the first PLC communication frequency band, to increase the output impedance in the first PLC communication frequency band.

With reference to the second possible implementation of the third aspect, in a third possible implementation, the power electronic apparatus includes a control unit and a power electronic circuit, and the power electronic circuit includes at least one switch device; and that the power electronic apparatus reduces a harmonic current or an interharmonic current in the first PLC communication frequency band includes:

obtaining, by the control unit, a target control voltage, generating a switch signal based on the target control voltage, and controlling an action of the switch device in the power electronic circuit based on the switch signal, so as to control the harmonic current or the interharmonic current of the power electronic circuit in the first PLC communication frequency band.

With reference to the third possible implementation of the third aspect, in a fourth possible implementation, the power electronic apparatus further includes a sampling unit. The method further includes:

detecting the output current of the power electronic circuit by using the sampling unit; and.

extracting by the control unit, a current component, in the first PLC communication frequency band, of the output current that is of the power electronic circuit and that is detected by the sampling unit, so as to use the current component as the harmonic current or the interharmonic current of the power electronic circuit in the first PLC communication frequency band.

With reference to the third possible implementation of the third aspect or the fourth possible implementation of the third aspect, in a fifth possible implementation, the obtaining, by the control unit, a target control voltage includes:

obtaining, by the control unit, an output voltage of the power electronic circuit, and determining the target control voltage based on the output voltage and a preset control voltage, where the preset control voltage is determined based on the harmonic current or the interharmonic current of the power electronic circuit in the first PLC communication frequency band and a preset current.

With reference to the fifth possible implementation of the third aspect, in a sixth possible implementation, the method further includes:

determining, by the control unit, the preset control voltage based on the harmonic current or the interharmonic current of the power electronic circuit in the first PLC communication frequency band and the preset current.

With reference to the sixth possible implementation of the third aspect, in a seventh possible implementation, the determining, by the control unit, the preset control voltage based on the harmonic current or the interharmonic current of the power electronic circuit in the first PLC communication frequency band and the preset current includes:

performing, by the control unit, a proportional integral operation or a proportional resonant operation on a current difference between the harmonic current or the interharmonic current in the first PLC communication frequency band and the preset current, to obtain the preset control voltage.

The output impedance of the power electronic apparatus in the PLC communication frequency band may be increased to suppress interference from the power electronic apparatus to PLC communication without adding an additional passive filter. This reduces interference suppression costs and improves applicability of the solution.

DETAILED DESCRIPTION OF THE EMBODIMENTS

Figure 1:
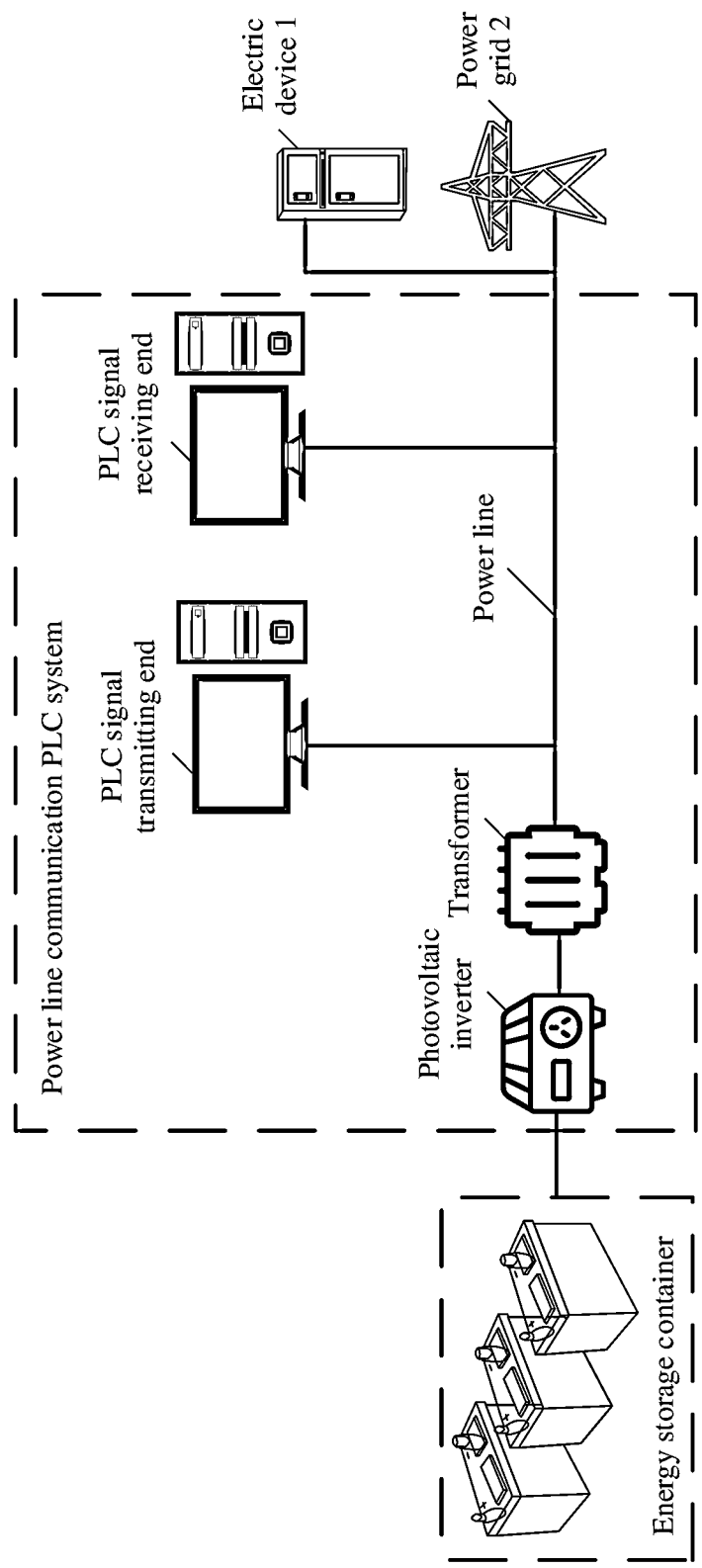
FIG. 1 is a schematic diagram of an application scenario of a power line communication system.

The power line communication system is applicable to a photovoltaic power station and may be applied to a microgrid field and the like. This is not limited herein. For example, refer to FIG. 1. FIG. 1 is a schematic diagram of an application scenario of a power line communication system. As shown in FIG. 1, a system of a photovoltaic power station may include an energy storage container, a power line communication system, an electric device, and a power grid. The power line communication system includes a power electronic apparatus (such as an inverter), a transformer, a PLC signal transmitting end (such as a desktop computer), a PLC signal receiving end (such as a desktop computer), and the like. The energy storage container is configured to output direct-current electrical energy to the inverter. The inverter may be configured to: perform power conversion on the direct-current electrical energy input by the energy storage container; and after the transformer performs voltage conversion, output alternating-current electrical energy to an alternating-current power grid (such as a power grid 2) or an alternating-current load (such as an electric device 1), so as to supply power to the power grid 2 and the electric device 1. The PLC signal transmitting end can communicate with the PLC signal receiving end through a power line by using a PLC technology.

The PLC technology may also be referred to as a power line communication technology. The PLC technology emerged in the early 1920s. The PLC technology uses an existing medium/low-voltage power distribution network as a transmission medium to transmit data and exchange information. When data (for example, multimedia data such as a voice, an image, and/or a video) is sent by using the PLC technology, the PLC signal transmitting end may first modulate the data to a high-frequency carrier, and then perform power amplification and couple, through a coupled circuit, the data to a power line for transmission. The PLC signal receiving end uses a filter to extract and demodulate a modulated signal, to obtain an original signal. In this way, information is transmitted. Compared with a conventional communication solution in which a dedicated communication cable is required, the PLC technology uses an existing power line to transmit an analog signal or a digital signal at a high speed in a carrier mode. The PLC technology does not need to re-establish a network and can transmit data through an existing power line, and therefore is more cost-effective and more applicable. However, as a power electronic apparatus is more widely used in a power line communication system, interference from the power electronic apparatus to PLC communication gradually becomes more noticeable.

Figure 2A:
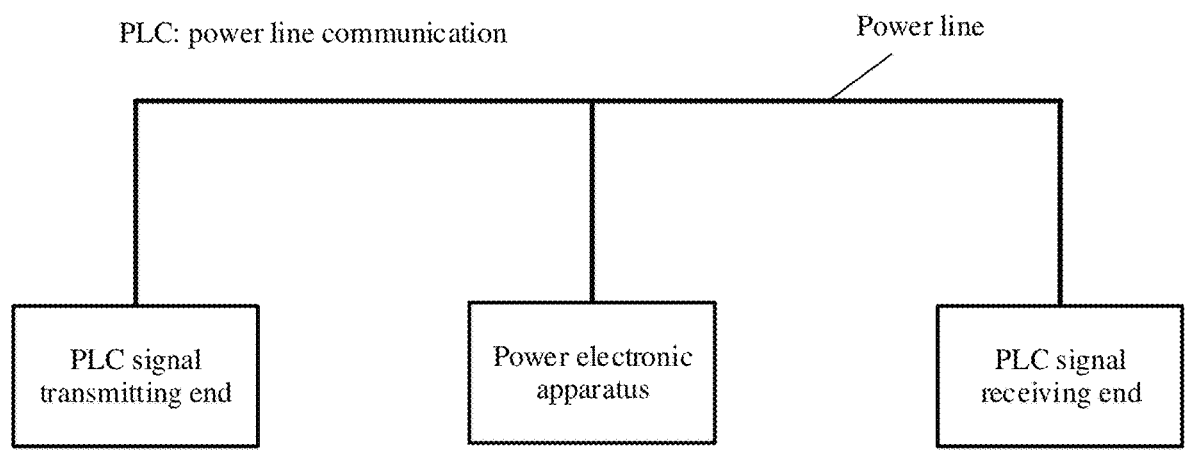
FIG. 2a is a schematic diagram depicting a structure of a PLC system.

FIG. 2a is a schematic diagram depicting a structure of a PLC system. As shown in FIG. 2a, the PLC system includes a PLC signal transmitting end, a PLC signal receiving end, a power electronic apparatus, and a controller (not shown in the figure) of the power electronic apparatus. The PLC signal transmitting end is connected to the PLC signal receiving end through a power line, the power electronic apparatus is connected to the power line, and the controller is connected to the power electronic apparatus through a control bus. The power line may have line impedance. Optionally, the PLC system may further include a device such as a transformer.

Figure 2B:
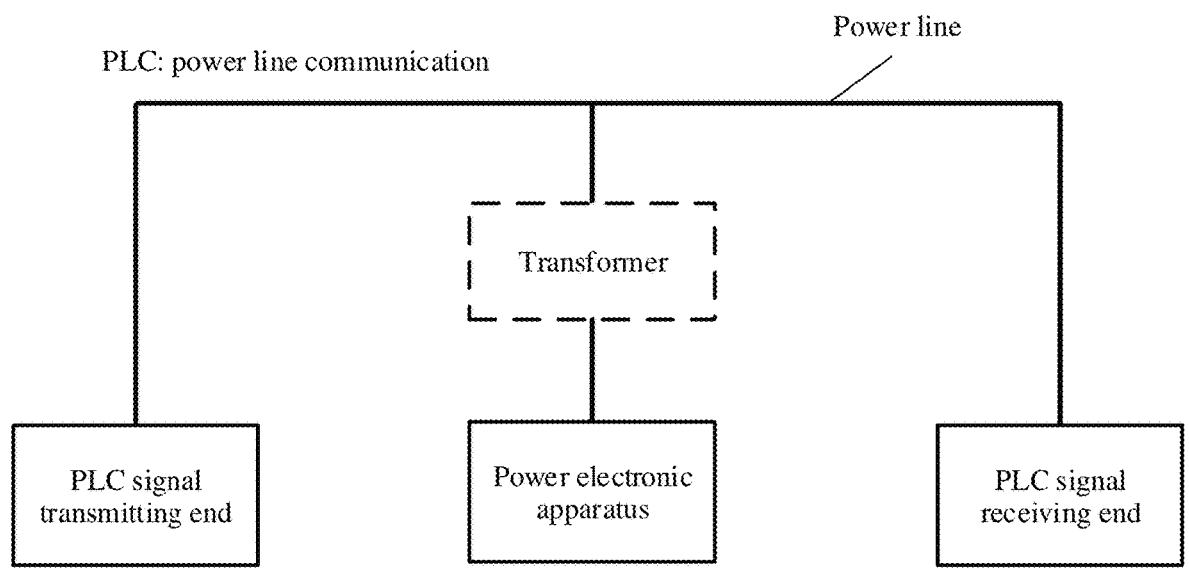
FIG. 2b is a schematic diagram depicting still another structure of a PLC system.

FIG. 2b is a schematic diagram depicting another structure of a PLC system. As shown in FIG. 2b, the PLC system includes a PLC signal transmitting end, a PLC signal receiving end, a transformer, a power electronic apparatus, and a controller (not shown in the figure) of the power electronic apparatus. The PLC signal transmitting end is connected to the PLC signal receiving end through a power line, the power electronic apparatus is connected to the power line through the transformer, and the controller is connected to the power electronic apparatus through a control bus. The controller is configured to control the power electronic apparatus to operate normally.

It may be understood that the PLC signal transmitting end and the PLC signal receiving end may be various terminal devices having a communication function. For example, the PLC signal transmitting end and/or the PLC signal receiving end each may be a smartphone, a tablet, a notebook computer, a desktop computer, or the like. This is not limited herein. The power electronic apparatus may be an inverter, a frequency converter, or the like. This is not limited herein. For example, the power electronic apparatus may be a three-phase inverter, a single-phase inverter, or the like. This is not limited herein. When the PLC signal transmitting end communicates with the PLC signal receiving end, the PLC signal transmitting end may modulate to-be-sent data to a power line for transmission, and the PLC signal receiving end extracts and demodulates a modulated signal to obtain an original signal (that is, data sent by the PLC signal transmitting end). The data sent by the PLC signal transmitting end to the PLC signal receiving end may be multimedia data such as a voice, an image, or a video, which is not limited herein. It may be understood that a switching frequency of the power electronic apparatus in the PLC system is relatively high and may be higher than a PLC communication frequency band. Therefore, harmonic interference in the PLC communication frequency band is caused. Consequently, PLC communication quality is affected. In view of this, a related technology proposes that a filter may be connected to an output end of the power electronic apparatus, to reduce interference from the power electronic apparatus to a PLC communication signal on a power transmission line.

Figure 3:
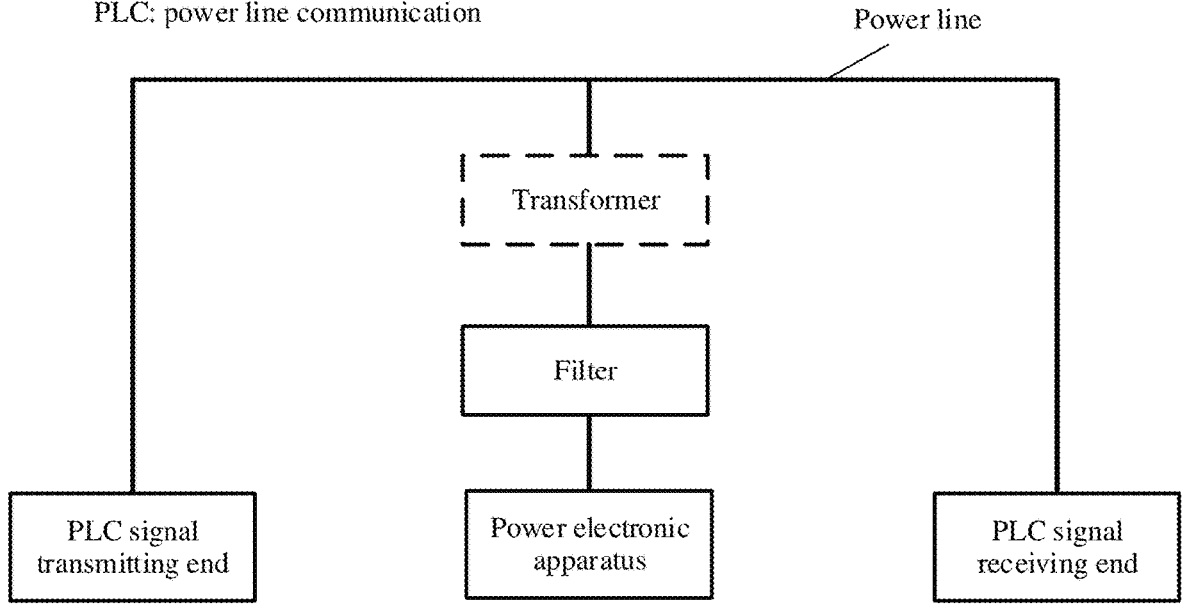
FIG. 3 is a schematic diagram depicting another structure of a PLC system.

FIG. 3 is a schematic diagram depicting another structure of a PLC system. As shown in FIG. 3, the PLC system includes a PLC signal transmitting end, a PLC signal receiving end, a transformer, a power electronic apparatus, a controller (not shown in the figure) of the power electronic apparatus, and a filter. The PLC signal transmitting end is connected to the PLC signal receiving end through a power line, the power electronic apparatus is connected to the power line through the filter, and the controller is connected to the power electronic apparatus through a control bus. It can be understood from FIG. 3 that this manner of reducing interference from the power electronic apparatus to PLC communication by adding an additional passive apparatus (such as the filter) increases costs of the power line communication system and is not highly applicable.

In view of this, the embodiment provides a power line communication system. The power line communication system includes a PLC signal transmitting end, a PLC signal receiving end, and a power electronic apparatus. For example, refer to FIG. 2a. The PLC signal transmitting end is connected to the PLC signal receiving end through a power line, and the power electronic apparatus is connected to the power line. The power electronic apparatus is configured to increase output impedance in a first PLC communication frequency band, to reduce interference from an output current of the power electronic apparatus to a PLC signal in the first PLC communication frequency band. The first PLC communication frequency band is a PLC communication frequency band in which the PLC signal transmitting end sends the PLC signal to the PLC signal receiving end. The first PLC communication frequency band may be a frequency or a frequency interval (or a frequency range). This is not limited herein. It may be understood that interference from the power electronic apparatus to PLC communication may be suppressed through self-control of the power electronic apparatus without adding an additional passive filter. That interference from the power electronic apparatus to PLC communication may be suppressed through self-control of the power electronic apparatus may be understood as that the power electronic apparatus suppresses interference through self-control on the basis that a function of the power electronic apparatus is implemented. For example, it is assumed that the power electronic apparatus is an inverter. The inverter may increase output impedance of the inverter while converting a direct current into an alternating current, so as to reduce interference in PLC communication. In other words, a control manner used by the power electronic apparatus to suppress interference does not affect a function of the power electronic apparatus.

In some implementations, the PLC system further includes a controller, and the controller is connected to the power electronic apparatus through a control bus. The controller may be configured to control the power electronic apparatus to operate normally. For example, when the power electronic apparatus is the inverter, the controller may be configured to control the inverter to perform conversion between a direct current and an alternating current. In this embodiment, the controller may be further configured to send the first PLC communication frequency band to the power electronic apparatus.

Figure 4:
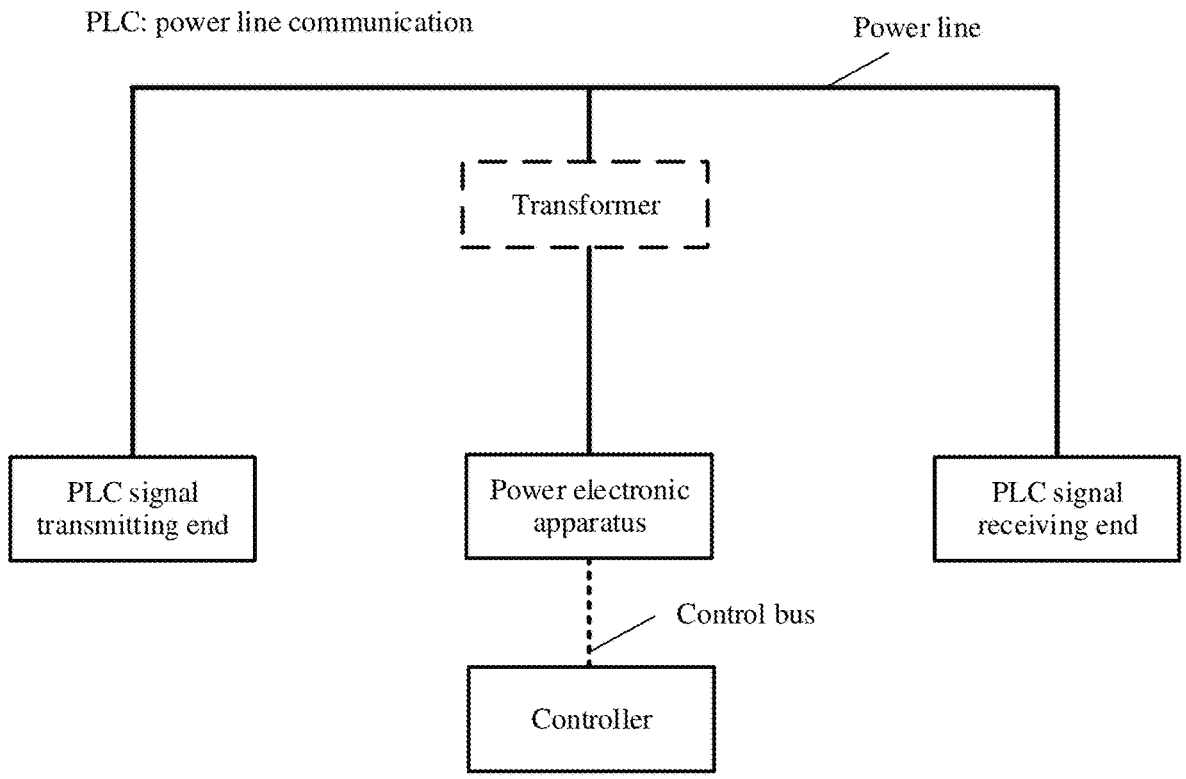
FIG. 4 is a schematic diagram depicting yet another structure of a PLC system.

FIG. 4 is a schematic diagram depicting another structure of a PLC system. As shown in FIG. 4, the PLC system includes a PLC signal transmitting end, a PLC signal receiving end, a transformer, a power electronic apparatus, and a controller of the power electronic apparatus. The PLC signal transmitting end is connected to the PLC signal receiving end through a power line, and the power electronic apparatus is connected to the power line. Alternatively, the power electronic apparatus may be connected to the power line via the transformer. The controller may be connected to the power electronic apparatus through a control bus, so as to send the first PLC communication frequency band to the power electronic apparatus. Alternatively, the controller may establish a communication connection to the power electronic apparatus in a wireless communication manner, so as to send the first PLC communication frequency band to the power electronic apparatus. It may be understood that the first PLC communication frequency band may be a frequency or a frequency interval (or a frequency range). This is not limited herein. The power electronic apparatus may increase the output impedance of the power electronic apparatus in the first PLC communication frequency band by increasing output resistance of the power electronic apparatus in the first PLC communication frequency band, or by increasing output reactance of the power electronic apparatus in the first PLC communication frequency band, or by increasing both the output resistance and the output reactance of the power electronic apparatus in the first PLC communication frequency band. This is determined based on an actual application scenario and is not limited herein. This embodiment is described by using an example in which both the output resistance and the output reactance of the power electronic apparatus in the first PLC communication frequency band are increased (in short, the output impedance of the power electronic apparatus in the first PLC communication frequency band is increased for ease of description below).

In some implementations, the power electronic apparatus may reduce a harmonic current or an interharmonic current in the first PLC communication frequency band, to increase the output impedance in the first PLC communication frequency band. The power electronic apparatus may include modules such as a control unit and a power electronic circuit.

Figure 5:
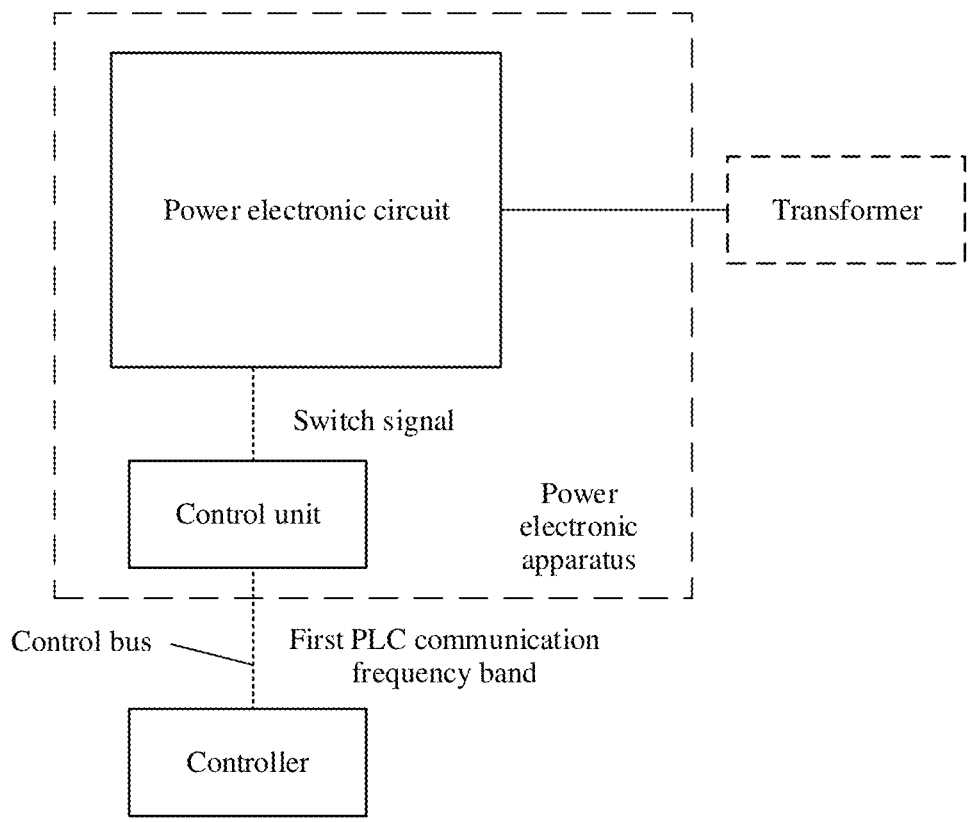
FIG. 5 is a schematic diagram depicting a structure of a power electronic apparatus according to an embodiment.

FIG. 5 is a schematic diagram depicting a structure of the power electronic apparatus in this embodiment. As shown in FIG. 5, the power electronic apparatus includes the power electronic circuit and the control unit. The control unit is configured to generate a switch signal based on a target control voltage, so as to control operation of the power electronic circuit based on the switch signal and to reduce the harmonic current or the interharmonic current of the power electronic circuit in the first PLC communication frequency band. It may be understood that the power electronic circuit may include at least one switch device. For example, the foregoing switch device may be a metal-oxide-semiconductor field-effect transistor (MOSFET), an insulated gate bipolar transistor (IGBT), or the like that is made of a material such as a semiconductor material or a third-generation wide-bandgap semiconductor material, where the semiconductor material is silicon (Si), and the third-generation wide-bandgap semiconductor material is silicon carbide (SiC), gallium nitride (GaN), or the like. This is not limited herein. The switch signal generated by the control unit based on the target control voltage may be used to control an action of the switch device in the power electronic circuit, to reduce the harmonic current or the interharmonic current of the power electronic circuit in the first PLC communication frequency band. The target control voltage may be determined by the control unit based on an output voltage of the power electronic circuit and a preset control voltage. The preset control voltage may be determined by the control unit based on the harmonic current or the interharmonic current of the power electronic circuit in the first PLC communication frequency band and a preset current. The control unit may be further configured to extract a current component, in the first PLC communication frequency band, of a detected output current of the power electronic circuit, so as to use the current component as the harmonic current or the interharmonic current of the power electronic circuit in the first PLC communication frequency band.

Figure 6:
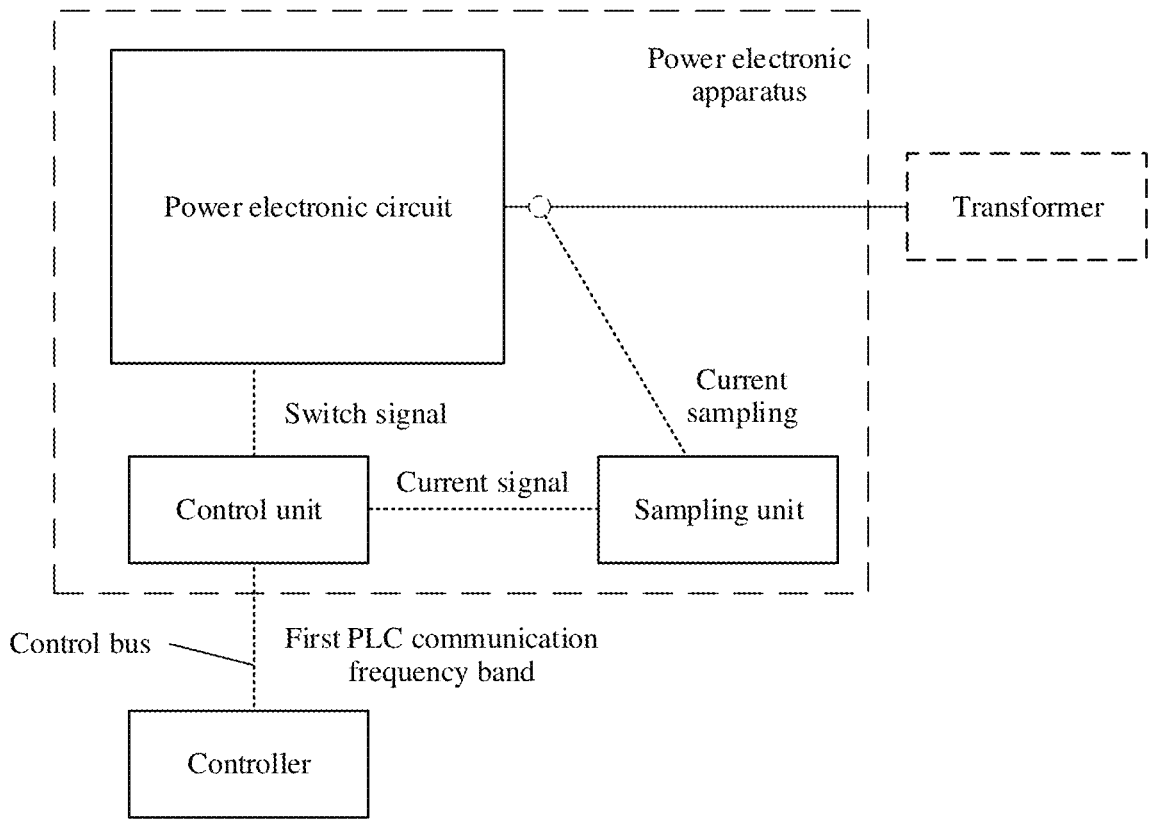
FIG. 6 is a schematic diagram depicting another structure of a power electronic apparatus according to an embodiment.

Optionally, the power electronic apparatus may further include a sampling unit. FIG. 6 is a schematic diagram depicting another structure of the power electronic apparatus in this embodiment. As shown in FIG. 6, the sampling unit is connected to an output end of the power electronic circuit, and the control unit is connected to the sampling unit. The sampling unit is configured to detect/sample the output current of the power electronic circuit, and send an obtained current signal (that is, the output current of the power electronic circuit) to the control unit. The control unit may be configured to extract a current component, in the first PLC communication frequency band, of the output current that is of the power electronic circuit and that is detected by the sampling unit, so as to use the current component as the harmonic current or the interharmonic current of the power electronic circuit in the first PLC communication frequency band. A manner of extracting the current component includes but is not limited to coordinate transformation, fast Fourier transformation, a digital filter, a digital notch filter, or the like. This is not limited herein. It may be understood that an alternating-current non-sinusoidal signal (for example, the output current of the power electronic circuit) may be decomposed into a linear combination of sine-wave component of different frequencies. If a frequency of the sine-wave component is the same as a frequency (such as 50 Hz) of the original alternating-current signal, the sine-wave component is referred to as a fundamental wave. If the frequency of the sine-wave component is an integer multiple of the frequency of the original alternating-current signal, the sine-wave component is referred to as a harmonic. If the frequency of the sine-wave component is a non-integer multiple of the frequency of the original alternating-current signal, the sine-wave component is referred to as a fractional harmonic, a subharmonic, or an interharmonic.

Figure 7:
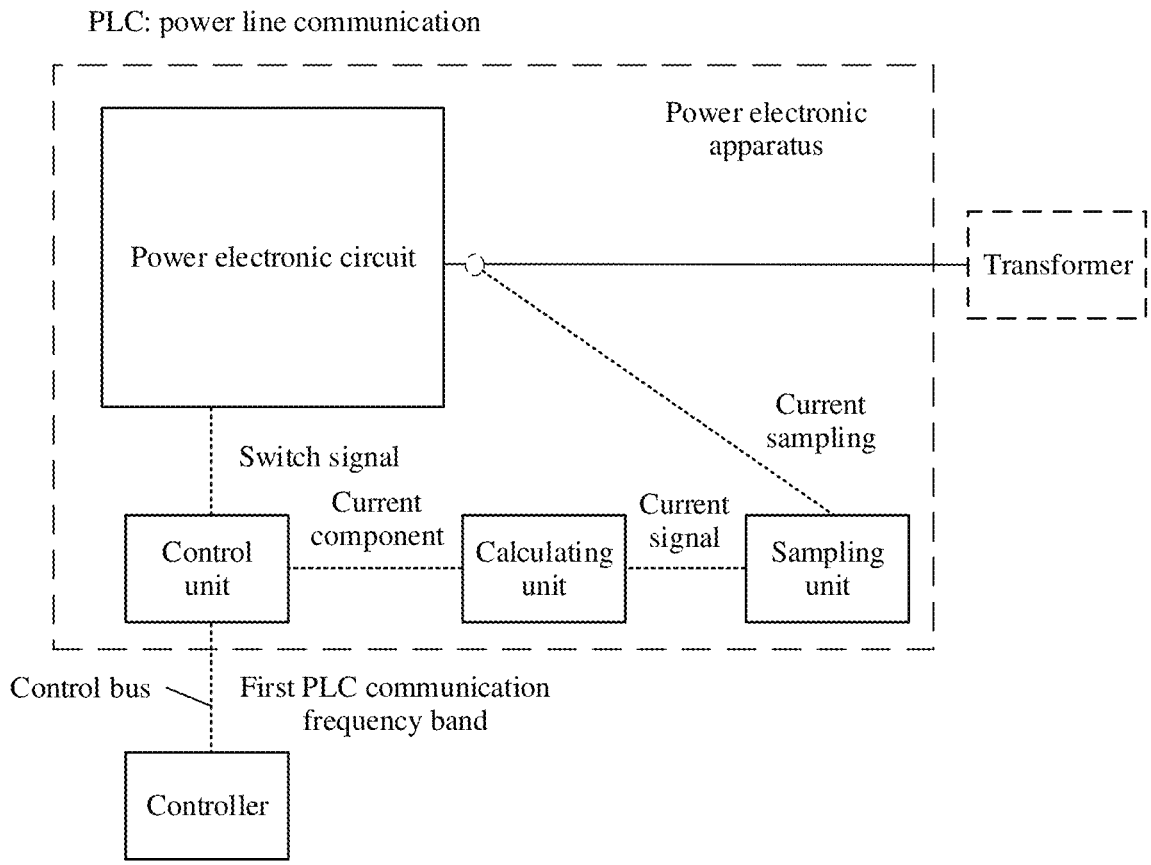
FIG. 7 is a schematic diagram depicting still another structure of a power electronic apparatus according to an embodiment.

Optionally, the power electronic apparatus may further include a calculating unit. FIG. 7 is a schematic diagram depicting another structure of the power electronic apparatus in this embodiment. As shown in FIG. 7, the sampling unit is connected to the output end of the power electronic circuit, and the control unit is connected to the sampling unit via the calculating unit. The calculating unit may be configured to extract a current component, in the first PLC communication frequency band, of the output current that is of the power electronic circuit and that is detected by the sampling unit, so as to use the current component as the harmonic current or the interharmonic current of the power electronic circuit in the first PLC communication frequency band. Further, the calculating unit may send the extracted harmonic current or interharmonic current in the first PLC communication frequency band to the control unit. Then, the control unit may determine the preset control voltage based on the harmonic current or the interharmonic current in the first PLC communication frequency band and the preset current, determine the target control voltage based on the preset control voltage and the output voltage of the power electronic circuit, and generate the switch signal based on the target control voltage, so as to control the power electronic circuit. In other words, the foregoing process of processing the output current of the power electronic circuit to generate the switch signal may be implemented by an integrated unit (such as the control unit shown in FIG. 6) or may be implemented by two units (such as the control unit and the calculating unit that are shown in FIG. 7). This is not limited herein. For ease of description, in this embodiment, the control unit may be used as the integrated unit (such as the control unit shown in FIG. 6).

It may be understood that when the control unit obtains the current component (for ease of description, this is briefly referred to as the harmonic current or interharmonic current in the first PLC communication frequency band below), in the first PLC communication frequency band, of the output current of the power electronic circuit, a regulator may be used to obtain a control voltage (such as the preset control voltage). The regulator may be a proportional resonance controller, a resonant controller, a quasi-resonant controller, or the like. This is not limited herein. For example, the regulator is the proportional resonance controller. In this case, the control unit is configured to perform a proportional integral operation or a proportional resonant operation on a current difference between the harmonic current or the interharmonic current in the first PLC communication frequency band and the preset current, to obtain the preset control voltage. The preset current may be set to 0. Alternatively, the preset current may be set to a value close to 0. In this embodiment, the current component, in the first PLC communication frequency band, of the output current of the power electronic circuit is controlled to be 0 (or infinitely close to 0), and a closed-loop regulator is used to obtain the preset control voltage. Then, the preset control voltage is superimposed on the output voltage of the power electronic circuit, to obtain the target control voltage. Finally, a modulation-driving procedure is performed on the target control voltage to generate the switch signal, so as to control the power electronic circuit.

For ease of understanding, for example, the power electronic apparatus in the PLC system is a three-phase inverter. The first PLC communication frequency band $f_0$ is sent to the three-phase inverter by the controller. The three-phase inverter may obtain, through sampling, three-phase output currents $i_a$, $i_b$, and $i_c$ of the three-phase inverter by using a sampling unit of the three-phase inverter. Then, abc/dq coordinate transformation is performed to obtain a d-axis current component $i_{d\_f0}$ and a q-axis current component $i_{q\_f0}$ of the three-phase output currents $i_a$, $i_b$, and $i_c$ in a dq coordinate system that is rotated by using the first PLC communication frequency band $f_0$.

The d-axis current component $i_{d\_f0}$ and the q-axis current component $i_{q\_f0}$ are separately processed by a low-pass filter, to obtain a filtered d-axis current component $i_{flt\_f0}$ and a filtered q-axis current component $i_{qflt\_f0}$. The filtered d-axis current component $i_{dflt\_f0}$ and the filtered q-axis current component $i_{qflt\_f0}$ are separately processed by the proportional resonance controller, to obtain a d-axis preset control voltage $u_{d\_f0}$ and a q-axis preset control voltage $u_{q\_f0}$. Finally, $u_{d\_f0}$ and $u_{q\_f0}$ are respectively superimposed on a d-axis output voltage $u_d$ and a q-axis output voltage $u_q$ of the three-phase inverter, to obtain a d-axis target control voltage $u_{d\_final}$ and a q-axis target control voltage $u_{q\_final}$. Further, dq/abc coordinate transformation is performed to obtain final control values $u_{a\_final}$, $u_{b\_final}$, and $u_{c\_final}$ (that is, target control voltages) for output voltages of all phases of the three-phase inverter. Therefore, a switch signal used to control a switch device in the three-phase inverter may be generated based on the target control voltages $u_{a\_final}$, $u_{b\_final}$, and $u_{c\_final}$.

For another example, it is assumed that the power electronic apparatus in the PLC system is a single-phase inverter. The first PLC communication frequency band $f_0$ is sent to the single-phase inverter by the controller. The single-phase inverter may obtain, through sampling, a single-phase output current $i_\alpha$ of the single-phase inverter by using a sampling unit of the single-phase inverter. Then, a notch filter is used to obtain a current component $i_{\alpha\_trap}$, in the first PLC communication frequency band $f_0$, of the single-phase output current $i_\alpha$. Further, the current component $i_{\alpha\_trap}$ is processed by a proportional resonant regulator, to obtain a preset control voltage $u_{\alpha\_f0}$ to be superimposed on an output voltage $u_\alpha$ of the single-phase inverter. Then, the preset control voltage $u_{\alpha\_f0}$ may be superimposed on $u_\alpha$, to obtain a final control value $u_{\alpha\_final}$ (that is, a target control voltage). Therefore, a switch signal used to control a switch device in the three-phase inverter may be generated based on the target control voltage $u_{\alpha\_final}$.

In this embodiment, the harmonic current or the interharmonic current in the first PLC communication frequency band is reduced, which is equivalent to increasing the output impedance of the power electronic apparatus in the first PLC communication frequency band. Therefore, interference from the power electronic apparatus to PLC communication can be suppressed without adding an additional passive filter. This reduces interference suppression costs and improves applicability of the solution.

The following describes in detail an interference suppression method for a power line communication system.

Figure 8:
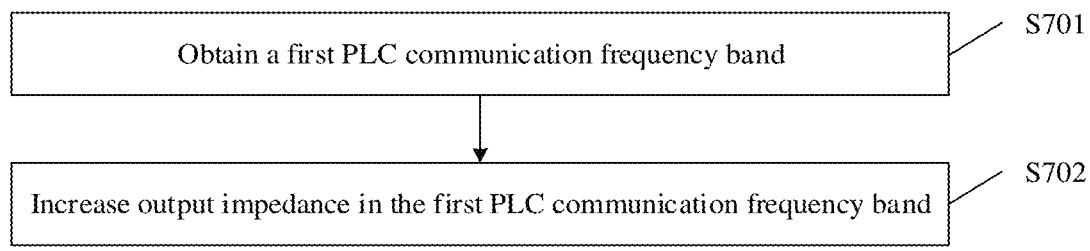
FIG. 8 is a flowchart of an interference suppression method for a power line communication system.

FIG. 8 is a flowchart of an interference suppression method for a power line communication system. The method is applicable to a power electronic apparatus in a power line communication system (the power line communication system shown in FIG. 1, FIG. 2a, FIG. 2b, and/or FIG. 4) provided in the foregoing embodiments. The PLC system includes a PLC signal transmitting end, a PLC signal receiving end, and a power electronic apparatus. The PLC signal transmitting end is connected to the PLC signal receiving end through a power line, and the power electronic apparatus is connected to the power line. As shown in FIG. 8, the method includes steps S701 and S702.

S701: Obtain a first PLC communication frequency band.

In some implementations, the power electronic apparatus obtains the first PLC communication frequency band, where the first PLC communication frequency band is a PLC communication frequency band in which the PLC signal transmitting end sends a PLC signal to the PLC signal receiving end. The PLC system may further include a controller, and the controller is connected to the power electronic apparatus. Therefore, the power electronic apparatus may receive the first PLC communication frequency band from the controller. A user may set/configure the first PLC communication frequency band on a display interface of the controller. The controller obtains, by monitoring an operation of the user on the display interface of the controller in real time, the first PLC communication frequency band configured by the user on the display interface and sends the first PLC communication frequency band to the power electronic apparatus.

S702: Increase output impedance in the first PLC communication frequency band.

In some implementations, after the power electronic apparatus obtains the first PLC communication frequency band, the power electronic apparatus may increase the output impedance in the first PLC communication frequency band, to reduce interference from an output current of the power electronic apparatus to the PLC signal in the first PLC communication frequency band. Increasing the output impedance in the first PLC communication frequency band may be understood as increasing the output impedance in the first PLC communication frequency band by reducing a harmonic current or an interharmonic current in the first PLC communication frequency band. The output current of the power electronic apparatus may be detected/sampled in real time. Then, a current component (that is, the harmonic current or the interharmonic current in the first PLC communication frequency band), in the first PLC communication frequency band, of the output current of the power electronic apparatus may be extracted in a manner such as coordinate transformation, fast Fourier transformation, a digital filter, or a digital notch filter. The current component, in the first PLC communication frequency band, of the output current of the power electronic apparatus is controlled to be 0 (or infinitely close to 0), and a closed-loop regulator is used to obtain a preset control voltage. The preset control voltage is superimposed on an output voltage of the power electronic apparatus, to obtain a target control voltage. Then, modulation-driving processing is performed on the target control voltage to obtain a switch signal, so as to suppress interference from the power electronic apparatus. It may be understood that the closed-loop regulator may be a proportional resonance controller, a resonant controller, a quasi-resonant controller, or the like. This is not limited herein.

Figure 9:
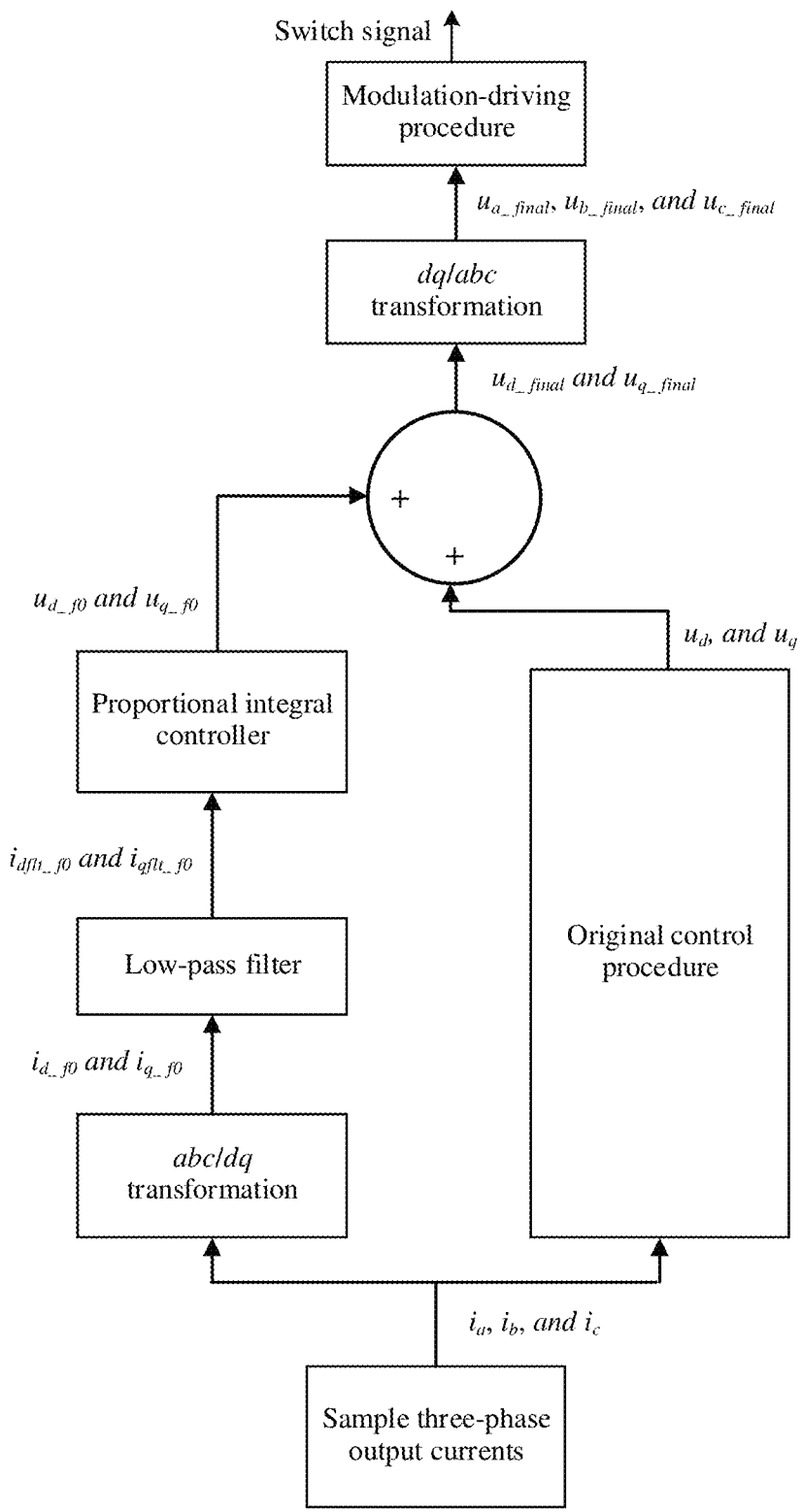
FIG. 9 is a flowchart of an interference suppression method according to an embodiment.

For example, the power electronic apparatus in the PLC system is a three-phase inverter. FIG. 9 is a flowchart of an interference suppression method according to an embodiment. A first PLC communication frequency band $f_0$ is sent to the three-phase inverter by using a controller. The three-phase inverter may obtain, through sampling, three-phase output currents $i_a$, $i_b$, and is of the three-phase inverter by using a sampling unit of the three-phase inverter. Then, abc/dq coordinate transformation is performed to obtain a d-axis current component $i_{d\_f0}$ and a q-axis current component $i_{q\_f0}$ of the three-phase output currents $i_a$, $i_b$, and $i_c$ in a dq coordinate system that is rotated by using the first PLC communication frequency band $f_0$. The d-axis current component $i_{d\_f0}$ and the q-axis current component $i_{q\_f0}$ are separately processed by a low-pass filter, to obtain a filtered d-axis current component $i_{dflt\_f0}$ and a filtered q-axis current component $i_{qflt\_f0}$. The filtered d-axis current component $i_{dflt\_f0}$ and the filtered q-axis current component $i_{qflt\_f0}$ are separately processed by the proportional resonance controller, to obtain a d-axis preset control voltage $u_{d\_f0}$ and a q-axis preset control voltage $u_{q\_f0}$.

Finally, $u_{d\_f0}$ and $u_{q\_f0}$ are respectively superimposed on a d-axis output voltage $u_d$ and a q-axis output voltage $u_q$ of the three-phase inverter, to obtain a d-axis target control voltage $u_{d\_final}$ and a q-axis target control voltage $u_{q\_final}$. Further, dq/abc coordinate transformation is performed to obtain final control values $u_{a\_final}$, $u_{b\_final}$, and $u_{c\_final}$ (that is, target control voltages) for output voltages of all phases of the three-phase inverter. Therefore, a switch signal used to control a switch device in the three-phase inverter may be generated based on the target control voltages $u_{a\_final}$, $u_{b\_final}$, and $u_{c\_final}$. It may be understood that the d-axis output voltage $u_d$ and the q-axis output voltage $u_q$ of the three-phase inverter may be determined based on the three-phase output currents $i_a$, $i_b$, and $i_c$ of the three-phase inverter. As shown in FIG. 9, the d-axis output voltage $u_d$ and the q-axis output voltage $u_q$ of the three-phase inverter may be obtained based on the three-phase output currents $i_a$, $i_b$, and $i_c$ by performing an original control procedure. That the d-axis output voltage $u_d$ and the q-axis output voltage $u_q$ of the three-phase inverter is obtained based on the three-phase output currents $i_a$, $i_b$, and $i_c$ by performing an original control procedure may be understood as: the d-axis output voltage $u_d$ and the q-axis output voltage $u_q$ of the three-phase inverter is obtained based on the three-phase output currents $i_a$, $i_b$, and $i_c$ by using a control method that uses a dq-axis PI regulator and that is based on synchronous coordinate transformation. A procedure is as follows: First, abc/dq coordinate transformation is performed on the three-phase output currents $i_a$, $i_b$, and $i_q$ of the three-phase inverter, to obtain the d-axis current $i_d$ and the q-axis current $i_q$ of the three-phase output currents in a synchronous coordinate system that is rotated by using a power frequency. Next, abc/dq coordinate transformation is performed on three-phase output current commands $i_{aref}$, $i_{bref}$, and $i_{cref}$ of the three-phase inverter, to obtain a d-axis current command $i_{dref}$ and a q-axis current command $i_{qref}$ of the three-phase output current commands in a synchronous coordinate system that is rotated by using the power frequency. Then, a difference between the d-axis current command $i_{dref}$ and the d-axis current $i_d$ is calculated, and the difference is processed by a proportional resonance controller, to obtain a d-axis output voltage $u_d$ of the three-phase inverter. Finally, a difference between the q-axis current command $i_{qref}$ and the q-axis current $i_q$ is calculated, and the difference is processed by the proportional resonance controller, to obtain a q-axis output voltage $u_q$ of the three-phase inverter.

Figure 10:
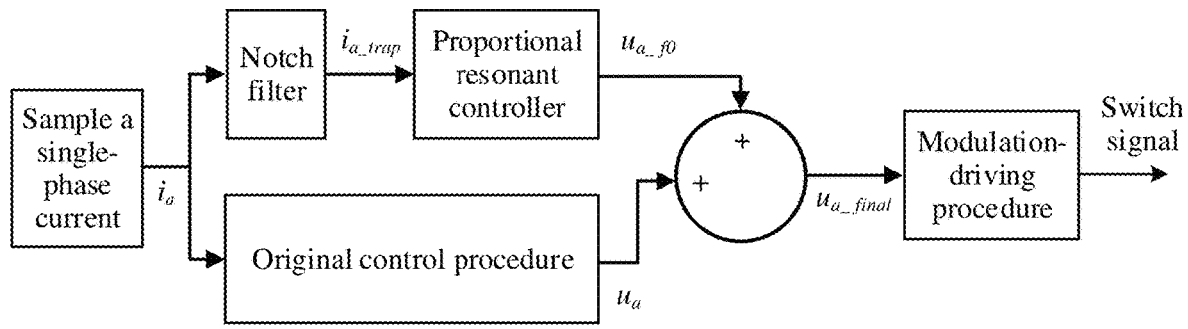
FIG. 10 is a flowchart of another interference suppression method according to an embodiment.

For another example, the power electronic apparatus in the PLC system is a single-phase inverter. FIG. 10 is a flowchart of another interference suppression method according to an embodiment. A first PLC communication frequency band $f_0$ is sent to the single-phase inverter by using a controller. The single-phase inverter may obtain, through sampling, a single-phase output current is of the single-phase inverter by using a sampling unit of the single-phase inverter. Then, a notch filter is used to obtain a current component $i_{\alpha\_trap}$, in the first PLC communication frequency band $f_0$, of the single-phase output current $i_\alpha$. Further, the current component $i_{\alpha\_trap}$ is processed by a proportional resonant regulator, to obtain a preset control voltage $u_{\alpha\_f0}$ to be superimposed on an output voltage $u_\alpha$ of the single-phase inverter. Then, the preset control voltage $u_{\alpha\_f0}$ may be superimposed on $u_\alpha$ to obtain a final control value $u_{\alpha\_final}$ (that is, a target control voltage). Therefore, a switch signal used to control a switch device in the three-phase inverter may be generated based on the target control voltage $u_{\alpha\_final}$. It may be understood that the output voltage $u_\alpha$ of the single-phase inverter may be determined based on the single-phase output current is of the single-phase inverter. As shown in FIG. 10, the output voltage $u_\alpha$ of the single-phase inverter may be obtained based on the single-phase output current is by performing an original control procedure. That the output voltage $u_\alpha$ of the single-phase inverter may be obtained based on the single-phase output current is by performing an original control procedure may be understood as: the output voltage $u_\alpha$ of the single-phase inverter is obtained based on the single-phase output current is by using a control method that is based on a PR (proportional resonant) regulator in a static coordinate system. A procedure is as follows: A difference between a single-phase current command $i_{\alpha ref}$ of the single-phase inverter and the single-phase current $i_\alpha$ is calculated, and the difference is processed by the proportional resonant controller, to obtain the single-phase output voltage $u_\alpha$ of the three-phase inverter.

In this embodiment, the harmonic current or the interharmonic current in the first PLC communication frequency band is reduced, which is equivalent to increasing the output impedance of the power electronic apparatus in the PLC communication frequency band. Therefore, interference from the power electronic apparatus to PLC communication can be suppressed without adding an additional passive filter. This reduces interference suppression costs and improves applicability of the solution.

Figure 11:
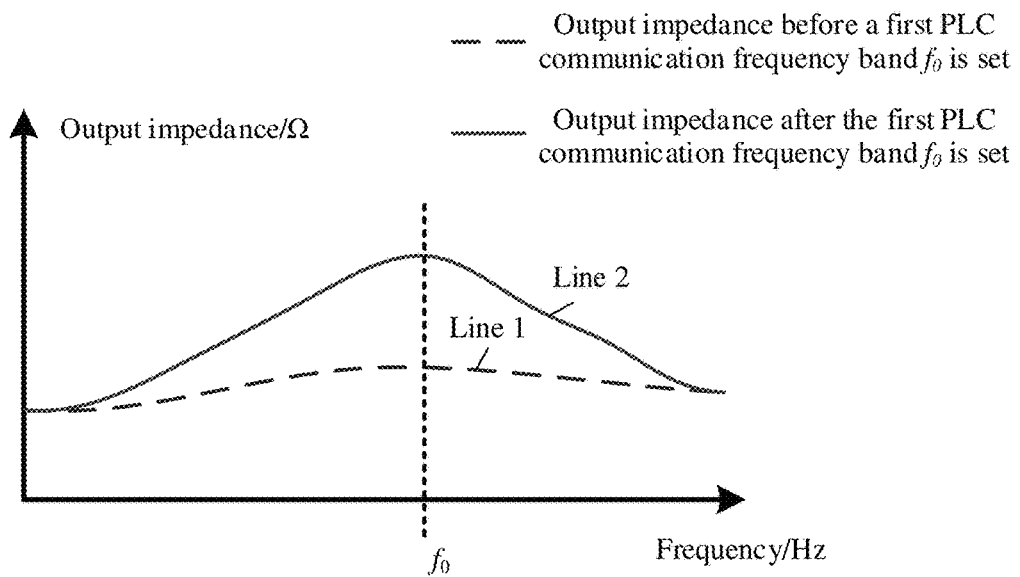
FIG. 11 is a schematic diagram depicting an effect of increasing output impedance according to an embodiment.

FIG. 11 is a schematic diagram depicting an effect of increasing output impedance according to an embodiment. As shown in FIG. 11, a line 1 represents output impedance that is of a power electronic apparatus and that exists before a first PLC communication frequency band $f_0$ is set; and a line 2 represents output impedance that is of the power electronic apparatus and that exists after the first PLC communication frequency band $f_0$ is set. It can be understood from FIG. 11 that the interference suppression method provided in embodiments can increase output impedance of the power electronic apparatus in the first PLC communication frequency band $f_0$, so as to reduce interference from the power electronic apparatus to PLC communication.

The foregoing descriptions are merely implementations but are not intended as limiting. Any variation or replacement readily figured out by a person skilled in the art shall fall within the scope of the embodiments.

What is claimed is:

1. A power line communication (PLC) system, comprising:
   a PLC signal transmitting end;
   a PLC signal receiving end; and
   a power electronic apparatus, wherein the PLC signal transmitting end is connected to the PLC signal receiving end through a power line, the power electronic apparatus is connected to the power line, and the power electronic apparatus is configured to
   increase output impedance in a first PLC communication frequency band, and
   reduce interference from an output current of the power electronic apparatus to a PLC signal in the first PLC communication frequency band, wherein the first PLC communication frequency band is a PLC communication frequency band in which the PLC signal transmitting end sends the PLC signal to the PLC signal receiving end.

2. The system according to claim 1, further comprising: a controller connected to the power electronic apparatus, wherein the controller is configured to send the first PLC communication frequency band to the power electronic apparatus.

3. The system according to claim 1, wherein the power electronic apparatus is further configured to:
   reduce a harmonic current or an interharmonic current in the first PLC communication frequency band, and
   increase the output impedance in the first PLC communication frequency band.

4. The system according to claim 3, wherein the power electronic apparatus comprises a control unit and a power electronic circuit, wherein the power electronic circuit further comprises at least one switch device, and the control unit is configured to:
   generate a switch signal based on a target control voltage, and
   control an action of the at least one switch device in the power electronic circuit based on the switch signal, so as to control the harmonic current or the interharmonic current of the power electronic circuit in the first PLC communication frequency band.

5. The system according to claim 4, wherein the power electronic apparatus further comprises a sampling unit, wherein the sampling unit is configured to
   detect the output current of the power electronic circuit; and the control unit is configured to
   extract a current component, in the first PLC communication frequency band, of the output current that is of the power electronic circuit and that is detected by the sampling unit, so as to use the current component as the harmonic current or the interharmonic current of the power electronic circuit in the first PLC communication frequency band.

6. The system according to claim 4, wherein the control unit is configured to determine the target control voltage based on an output voltage of the power electronic circuit and a preset control voltage, wherein the preset control voltage is determined based on the harmonic current or the interharmonic current of the power electronic circuit in the first PLC communication frequency band and a preset current.

7. An apparatus applicable to a power line communication (PLC) system comprising a PLC signal transmitting end and a PLC signal receiving end, the PLC signal transmitting end is connected to the PLC signal receiving end through a power line, the apparatus is connected to the power line and comprises:
   a control unit; and
   a power electronic circuit; wherein the control unit is configured to:
   increase output impedance of the power electronic circuit in a first PLC communication frequency band, and
   reduce interference from an output current of the power electronic circuit to a PLC signal in the first PLC communication frequency band, wherein the first PLC communication frequency band is a PLC communication frequency band in which the PLC signal transmitting end sends the PLC signal to the PLC signal receiving end.

8. The apparatus according to claim 7, wherein the power line communication system further comprises:
   a controller connected to the control unit and the control unit is configured to receive the first PLC communication frequency band from the controller.

9. The apparatus according to claim 7, wherein the control unit is further configured to:
   reduce a harmonic current or an interharmonic current in the first PLC communication frequency band, and
   increase the output impedance in the first PLC communication frequency band.

10. The apparatus according to claim 9, wherein the power electronic circuit further comprises at least one switch device, and the control unit is configured to:
    generate a switch signal based on a target control voltage, and
    control an action of the at least one switch device in the power electronic circuit based on the switch signal, so as to control the harmonic current or the interharmonic current of the power electronic circuit in the first PLC communication frequency band.

11. The apparatus according to claim 10, further comprising: a sampling unit, wherein the sampling unit is configured to detect the output current of the power electronic circuit; and
    the control unit is configured to extract a current component, in the first PLC communication frequency band, of the output current that is of the power electronic circuit and that is detected by the sampling unit, so as to use the current component as the harmonic current or the interharmonic current of the power electronic circuit in the first PLC communication frequency band.

12. The apparatus according to claim 10, wherein the control unit is configured to determine the target control voltage based on an output voltage of the power electronic circuit and a preset control voltage, wherein the preset control voltage is determined based on the harmonic current or the interharmonic current of the power electronic circuit in the first PLC communication frequency band and a preset current.

13. A method for a power line communication (PLC) system, wherein the method is applicable to a power electronic apparatus in the PLC system, the method comprising:
 obtaining, by the power electronic apparatus, a first PLC communication frequency band, wherein the first PLC communication frequency band is a PLC communication frequency band in which a PLC signal transmitting end sends a PLC signal to a PLC signal receiving end; and
 increasing output impedance in the first PLC communication frequency band, to reduce interference from an output current of the power electronic apparatus to the PLC signal in the first PLC communication frequency band; wherein,
 the PLC system comprises a PLC signal transmitting end, a PLC signal receiving end, and the power electronic apparatus, the PLC signal transmitting end is connected to the PLC signal receiving end through a power line, and the power electronic apparatus is connected to the power line; and.

14. The method according to claim 13, wherein the system further comprises a controller, and the controller is connected to the power electronic apparatus; and obtaining, by the power electronic apparatus, the first PLC communication frequency band further comprises:
 receiving, by the power electronic apparatus, the first PLC communication frequency band from the controller.

15. The method according to claim 13, further comprising:
 reducing, by the power electronic apparatus, a harmonic current or an interharmonic current in the first PLC communication frequency band, to increase the output impedance in the first PLC communication frequency band.

16. The method according to claim 15, wherein the power electronic apparatus comprises a control unit and a power electronic circuit, and the power electronic circuit comprises at least one switch device; and reducing, by the power electronic apparatus, the harmonic current or the interharmonic current in the first PLC communication frequency band further comprises:

obtaining, by the control unit, a target control voltage, generating a switch signal based on the target control voltage, and controlling an action of the switch device in the power electronic circuit based on the switch signal, so as to control the harmonic current or the interharmonic current of the power electronic circuit in the first PLC communication frequency band.

17. The method according to claim 16, wherein the power electronic apparatus further comprises a sampling unit, and the method further comprises:
 detecting, by the sampling unit, the output current of the power electronic circuit; and
 extracting, by the control unit, a current component, in the first PLC communication frequency band, of the output current that is of the power electronic circuit and that is detected by the sampling unit, so as to use the current component as the harmonic current or the interharmonic current of the power electronic circuit in the first PLC communication frequency band.

18. The method according to claim 16, wherein obtaining, by the control unit, the target control voltage further comprises:
 obtaining, by the control unit, an output voltage of the power electronic circuit, and determining the target control voltage based on the output voltage and a preset control voltage, wherein the preset control voltage is determined based on the harmonic current or the interharmonic current of the power electronic circuit in the first PLC communication frequency band and a preset current.

19. The method according to claim 18, further comprising:
 determining, by the control unit, the preset control voltage based on the harmonic current or the interharmonic current of the power electronic circuit in the first PLC communication frequency band and the preset current.

20. The method according to claim 19, wherein determining, by the control unit, the preset control voltage based on the harmonic current or the interharmonic current of the power electronic circuit in the first PLC communication frequency band and the preset current further comprises:
 performing, by the control unit, a proportional integral operation or a proportional resonant operation on a current difference between the harmonic current or the interharmonic current in the first PLC communication frequency band and the preset current, to obtain the preset control voltage.

\* \* \* \* \*